(12) United States Patent
Benton, Jr.

(10) Patent No.: US 10,301,788 B2
(45) Date of Patent: May 28, 2019

(54) EROSION CONTROL MAT SYSTEM

(71) Applicant: WASKEY BRIDGES, INC., Baton Rouge, LA (US)

(72) Inventor: Stephen G. Benton, Jr., Metairie, LA (US)

(73) Assignee: WASKEY BRIDGES, INC., Baton Rouge, LA (US)

(*) Notice: Subject to any disclaimer, the term of this patent is extended or adjusted under 35 U.S.C. 154(b) by 0 days.

(21) Appl. No.: 15/801,560

(22) Filed: Nov. 2, 2017

(65) Prior Publication Data

US 2018/0119377 A1    May 3, 2018

Related U.S. Application Data

(60) Provisional application No. 62/416,524, filed on Nov. 2, 2016, provisional application No. 62/525,697, filed on Jun. 27, 2017.

(51) Int. Cl.
*E02B 3/04*    (2006.01)
*E02B 3/12*    (2006.01)
(Continued)

(52) U.S. Cl.
CPC ............ *E02B 3/123* (2013.01); *B28B 7/0064* (2013.01); *B28B 23/0006* (2013.01);
(Continued)

(58) Field of Classification Search
CPC ... E02B 3/04; E02B 3/12; E02B 3/121; E02B 3/122; E02B 3/123; E02B 3/127;
(Continued)

(56) References Cited

U.S. PATENT DOCUMENTS 1,939,417 A * 12/1933 Schulz .................... E02B 3/123
                                                                405/20
1,983,772 A * 12/1934 Pierson ................... E02B 3/123
                                                                405/20
(Continued)

FOREIGN PATENT DOCUMENTS

EP          0152232        8/1985

OTHER PUBLICATIONS

PCT International Search Report and the Written Opinion of the International Searching Authority, PCT International Application No. PCT/US2017/059698; dated Mar. 8, 2018.

*Primary Examiner* — Benjamin F Fiorello
*Assistant Examiner* — Edwin J Toledo-Duran
(74) *Attorney, Agent, or Firm* — Garvey, Smith & Nehrbass, Patent Attorneys, L.L.C.; Charles C. Garvey, Jr.; Vanessa M. D'Souza

(57) ABSTRACT

A concrete mat apparatus, includes a plurality of elongated concrete members, each member being aligned with and next to another concrete member. Each of the concrete members has an upper generally flat surface, a lower generally flat surface, and a plurality of inclined surfaces that each extend away from an upper or lower surface. Reinforcement extends from a first end portion of each concrete member to a second end portion thereof, the reinforcement including a plurality of longitudinally extending reinforcement bars and a plurality of encircling tie bars at spaced apart intervals. Cabling connects each of the elongated concrete members to another of the elongated concrete members. The upper inclined surfaces of one of the elongated concrete members forms a plane with the lower inclined surface of an adjacent elongated concrete member. A plurality of loops are provided along opposed edges of the mat.

25 Claims, 12 Drawing Sheets

(51) Int. Cl.
  *B28B 7/00* (2006.01)
  *B28B 23/00* (2006.01)
  *E02B 17/00* (2006.01)
  *F16L 1/12* (2006.01)
  *B28B 23/02* (2006.01)

(52) U.S. Cl.
  CPC ...... *B28B 23/0012* (2013.01); *E02B 17/0017* (2013.01); *F16L 1/123* (2013.01); *B28B 23/022* (2013.01)

(58) Field of Classification Search
  CPC ..... E02B 17/025; E02D 31/002; E02D 31/06; B28B 23/005; G01N 17/00; G01N 33/383; E04B 5/38
  USPC .............. 405/15–20, 302.4, 302.6; 264/263; 404/34–40; 52/223.6–223.11, 223.4, 52/223.1, 223.14, 741.1, 606–611, 52/831–857; 73/803
  See application file for complete search history.

(56) References Cited

U.S. PATENT DOCUMENTS

| | | | |
|---|---|---|---|
| 3,386,252 A | 6/1968 | Nelson | |
| 3,486,341 A * | 12/1969 | Huesker-Stiewe | B28B 7/065 249/10 |
| 3,595,140 A * | 7/1971 | Lundin | E01C 3/006 404/35 |
| 3,597,928 A | 8/1971 | Pilaar | |
| 4,102,137 A * | 7/1978 | Porraz | E02B 3/127 405/172 |
| 4,152,875 A * | 5/1979 | Soland | E01C 9/086 404/35 |
| 4,227,829 A | 10/1980 | Landry, Jr. | |
| 4,242,010 A * | 12/1980 | Gjerde | E02B 3/123 405/157 |
| 4,375,928 A | 3/1983 | Crow et al. | |
| 4,477,206 A * | 10/1984 | Papetti | F16L 1/123 405/172 |
| 4,486,120 A | 12/1984 | Landry, Jr. | |
| 4,664,552 A * | 5/1987 | Schaaf | E02B 3/123 24/34 |
| 4,683,156 A * | 7/1987 | Waters | E02B 3/123 405/19 |
| 5,020,938 A * | 6/1991 | Scales | E02B 3/14 405/16 |
| 5,317,846 A * | 6/1994 | Michlovic | E04B 5/40 52/220.2 |
| 5,484,230 A * | 1/1996 | Rudloff | E02B 3/123 404/35 |
| 5,536,111 A * | 7/1996 | Doernemann | E02B 3/04 405/16 |
| 5,722,795 A | 3/1998 | Angel et al. | |
| 5,775,838 A * | 7/1998 | Pettee, Sr. | E02B 3/123 404/34 |
| 5,846,023 A | 12/1998 | Angel et al. | |
| 5,944,449 A | 8/1999 | Angel et al. | |
| 6,027,285 A | 2/2000 | Angel et al. | |
| 6,250,591 B1 * | 6/2001 | Cunningham | F16L 3/2235 248/65 |
| 6,406,217 B1 | 6/2002 | Daniel et al. | |
| 6,866,446 B2 * | 3/2005 | McAllister | E02B 3/123 405/16 |
| 7,278,613 B2 * | 10/2007 | Roy | F16L 3/02 248/49 |
| 7,470,093 B2 * | 12/2008 | Mansfield | E02B 3/066 405/284 |
| 7,708,495 B1 * | 5/2010 | Antee | E02B 3/108 405/111 |
| 8,496,396 B1 * | 7/2013 | Allen | E01C 5/08 404/36 |
| 8,858,118 B2 | 10/2014 | Benton, Jr. | |
| 8,919,057 B1 * | 12/2014 | Dupray | E04C 2/044 52/223.14 |
| 9,518,388 B1 * | 12/2016 | Wang | E04B 1/161 |
| 2002/0104469 A1 * | 8/2002 | Veazey | B63B 3/04 114/65 A |
| 2003/0017000 A1 | 1/2003 | Jansson | |
| 2003/0031509 A1 * | 2/2003 | Marsik, Jr. | E01C 9/08 404/35 |
| 2005/0220539 A1 * | 10/2005 | Yee | F16L 13/113 404/40 |
| 2006/0230696 A1 * | 10/2006 | Sarkkinen | E01D 19/125 52/223.6 |
| 2008/0022623 A1 * | 1/2008 | Brienen | E04C 5/0645 52/583.1 |
| 2012/0047816 A1 * | 3/2012 | Zhong | E04B 1/161 52/11 |
| 2012/0317906 A1 * | 12/2012 | Hammond | E01B 1/002 52/223.7 |
| 2013/0279983 A1 * | 10/2013 | Benton, Jr. | E02B 3/123 405/20 |
| 2014/0197283 A1 * | 7/2014 | Lake | F16L 3/222 248/49 |

\* cited by examiner

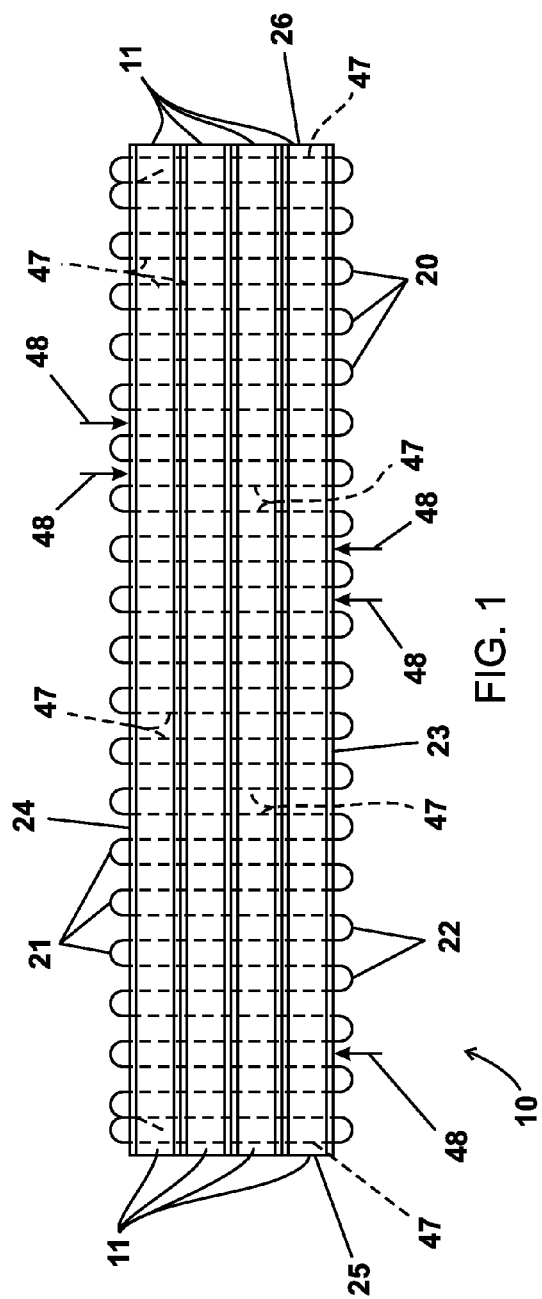
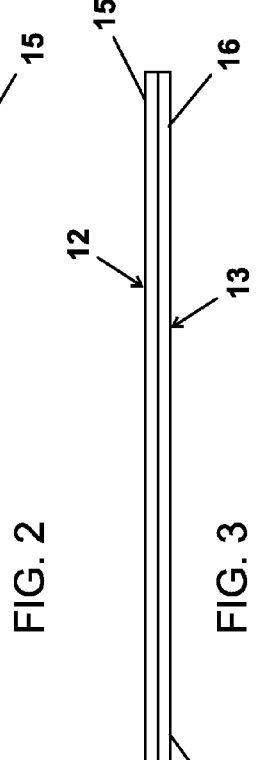
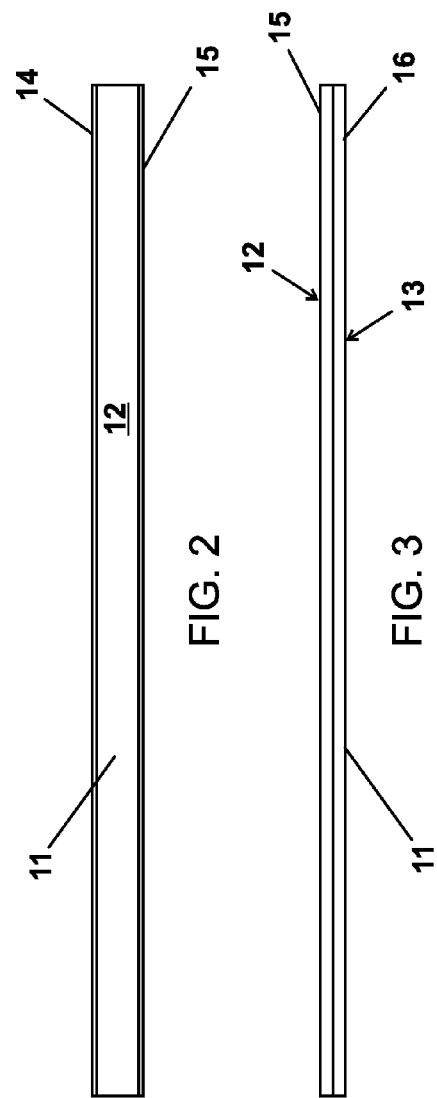

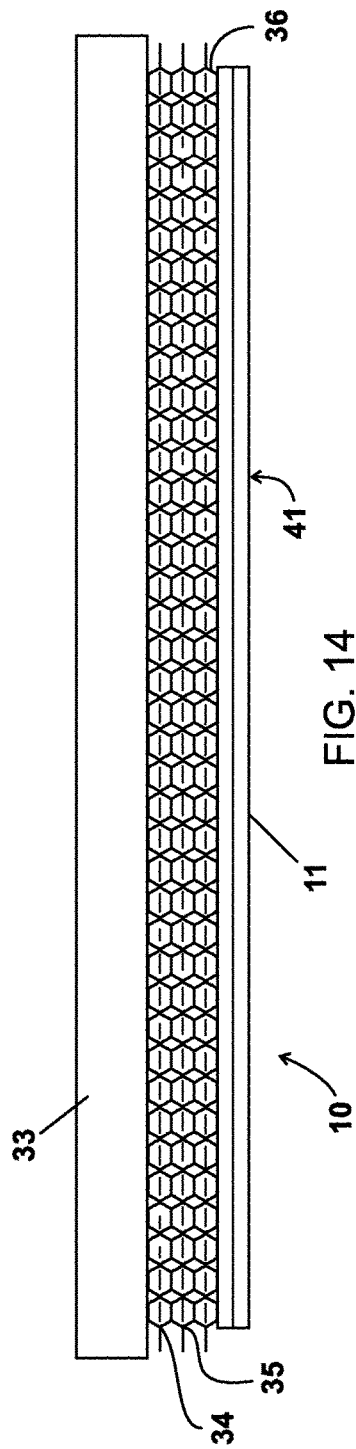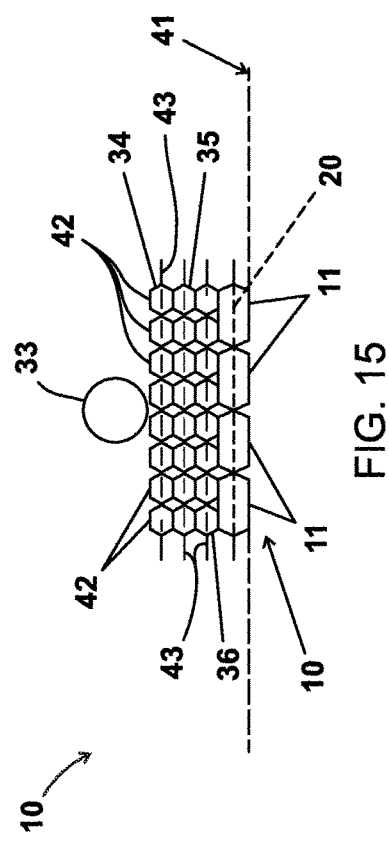

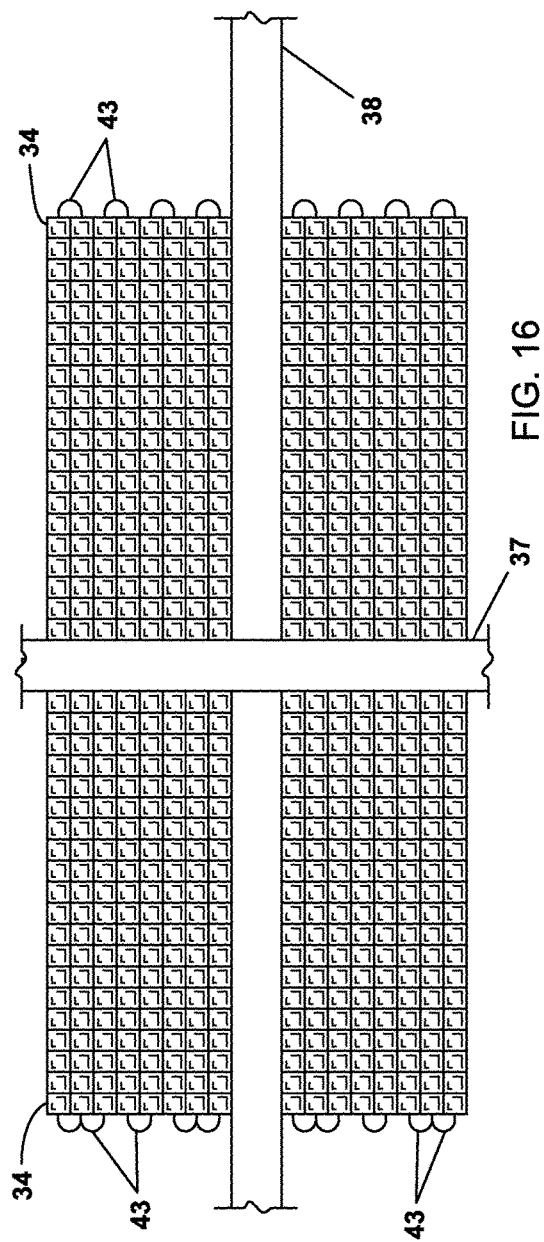
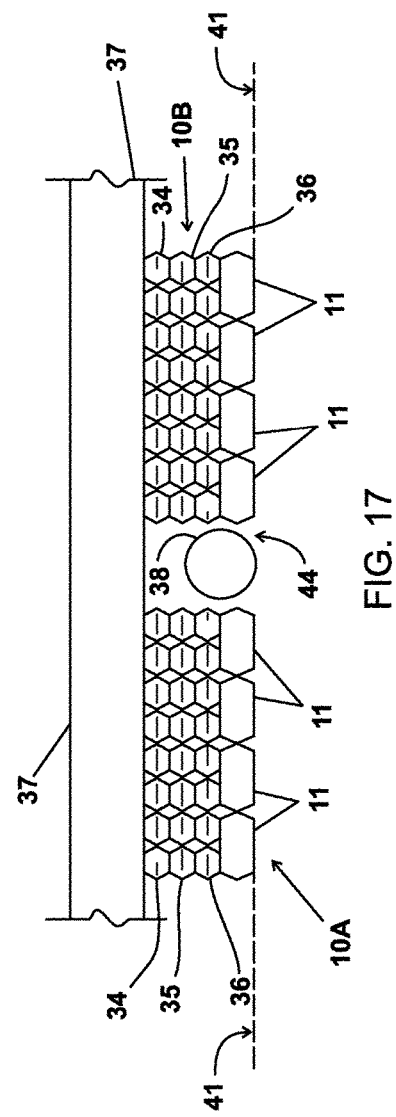
FIG. 16
FIG. 17

EROSION CONTROL MAT SYSTEM

CROSS-REFERENCE TO RELATED APPLICATIONS

This application claims benefit of U.S. Provisional Patent Application Ser. No. 62/416,524, filed 2 Nov. 2016; and U.S. Provisional Patent Application Ser. No. 62/525,697, filed 27 Jun. 2017, each of which is hereby incorporated herein by reference, and priority of/to each of which is hereby claimed.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to mats used for erosion control, pipeline protection, crossings, and many other subsea uses, and methods of installing such mats.

2. General Background of the Invention

Erosion control mats have been used for many years to protect soil surfaces such as the banks of water bodies (lakes, rivers, etc.). Such mats have also been used as protection for underwater pipelines.

Patents have issued that are directed to erosion control mats. An example of such an erosion control mat is the Pilaar patent (U.S. Pat. No. 3,597,928). The Pilaar patent relates to an erosion controlling protective surface for a soil mass. The device includes a flexible supporting sheet that can conform to the contour of the soil. Blocks are mounted on the supporting sheet. The mat provides drainage passageways therethrough so that water can pass through the surfacing. Preferably, the surfacing includes a filter and the blocks are secured with the supporting sheet.

The Nelson patent (U.S. Pat. No. 3,386,252) shows a rip rap structure that employs concrete blocks connected together.

Cables are employed to hold blocks together in the Landry patent (U.S. Pat. No. 4,227,829) to form a matrix of blocks.

The Crow patent (U.S. Pat. No. 4,375,928) shows rows of blocks held together by a continuous wire cable which is embedded in each block.

The Waters patent (U.S. Pat. No. 4,683,156) shows an erosion control blanket of segments. The segments are said to be of concrete placed into shells. The segments are held together with a rope network. Openings in the shells provide points of entry for the ropes.

The Rudloff patent (U.S. Pat. No. 5,484,230) provides a concrete block revetment system for soil erosion prevention. The system of the Rudloff patent provides concrete blocks that are cable interconnected to form a matrix. The matrix of blocks overlies and holds in place a layer of permeable geotextile overlying a protected soil area.

The Angel patent (U.S. Pat. No. 6,027,285) entitled "Mat Installation" shows cable connected erosion control blocks that can be used over pipelines. Other patents issued to Angel include numbers U.S. Pat. Nos. 5,722,795; 5,846,023; and 5,944,449.

The Landry patent (U.S. Pat. No. 4,486,120) provides a spreader bar for the installation of soil erosion prevention mats.

The Daniel patent (U.S. Pat. No. 6,406,217) provides a lifting and placing device for seabed mats.

Other patents possibly relevant to the construction and use of mats for erosion control, pipeline protection, crossings, and other subsea uses can be seen in the following table, the listing being chronological and otherwise of no significance. Each of the patents listed in the table (Table 1) is hereby incorporated herein by reference.

TABLE 1

| Pat. No. | Title | Issue Date MM/DD/YYYY |
| --- | --- | --- |
| 3,386,252 | Rip Rap Structure Device | 09/08/1966 |
| 3,597,928 | Erosion Control | 08/10/1971 |
| 4,227,829 | Soil Erosion Preventing Blocks | 10/14/1980 |
| 4,375,928 | Flexible Concrete For Soil Erosion Prevention | 03/08/1983 |
| 4,486,120 | Spreader Bar For Soil Erosion Prevention Mats | 12/04/1984 |
| 4,683,156 | Flexible Blanket | 07/28/1987 |
| 5,484,230 | Concrete Block Revetment System For Soil Erosion Prevention | 01/16/1996 |
| 5,722,795 | Non-Abrasive Subsea Mat | 03/03/1998 |
| 5,846,023 | Non-Abrasive Subsea Mat | 12/08/1998 |
| 5,944,449 | Non-Abrasive Subsea Mat | 08/31/1999 |
| 6,027,285 | Mat Installation | 02/22/2000 |
| 6,406,217 | Lifting and Placing Device for Seabed Mats | 06/18/2002 |
| 8,858,118 | Erosion Control Mat System | 10/14/2014 |

BRIEF SUMMARY OF THE INVENTION

The present invention provides an improved mat used for erosion control, pipeline protection, crossings, equipment support and other subsea uses, that utilizes a plurality of specially configured elongated concrete members.

In a preferred embodiment of the present invention, cables or ropes, e.g., copolymer rope, connect the elongated concrete members together to form a matrix. The cables or ropes can include multiple cables or ropes or one continuous cable/rope that is looped from one elongated concrete member to the next member.

The present invention includes a concrete mat apparatus, comprising a plurality of elongated concrete members, each member can be aligned with and next to another concrete member. Each of the concrete members can have an upper generally flat surface, a lower generally flat surface, and a plurality of inclined surfaces that each preferably extend away from an upper or lower surface. Reinforcement that can extend from a first end portion of each concrete member to a second end portion thereof. The reinforcement preferably including a plurality of longitudinally extending reinforcement bars and a plurality of encircling stirrups at spaced apart intervals. Cabling can connect each of the elongated concrete members to another of the elongated concrete members. The cabling preferably including generally parallel cable sections. Each cable section preferably extending transversely through multiple of said concrete members. The combination of elongated concrete members can have a width and a length that is at least twice as long as the width. The upper inclined surfaces of one of the elongated concrete members can form a plane with the lower inclined surface of an adjacent elongated concrete member. A plurality of loops can be along opposed edges of the mat, each loop formed by a portion of the cabling. The loops can be between about one and three feet (30.5 and 91.4 cm) apart. There can be stirrups on each side of a cable section.

In one embodiment, there can be least three of the elongated concrete members.

In one embodiment, there can be at least four of the elongated concrete members.

In one embodiment, each of the elongated concrete members can be about 40 feet (12.2 meters) in length.

In one embodiment, each of the elongated concrete members can be between about 20 and 40 feet (6.1-12.2 meters) long.

In one embodiment, the reinforcement includes a plurality of upper longitudinally extending reinforcement bars and a plurality of lower longitudinally extending reinforcement bars.

In one embodiment, each of the loops can be positioned at the intersection of an upper inclined surface and a lower inclined surface.

In one embodiment, the upper plurality of longitudinally extending reinforcement bars can be positioned in between two upper inclined surfaces.

In one embodiment, the plurality of longitudinally extending reinforcement bars can be positioned in between two lower inclined surfaces.

In one embodiment, the cabling can be positioned in a plane that is in between the upper and lower pluralities of longitudinally extending reinforcement bars.

In one embodiment, the loops can be formed with a continuous one piece elongated cable.

In one embodiment, the loops can be formed of a plurality of endless circular rope sections, each endless rope section including a first and a second spaced apart loops.

In one embodiment, each elongated concrete member can have a width and a height, the width being greater than the height.

In one embodiment, the mat apparatus can have an overall length and a width, wherein the overall length can be greater than the width.

In one embodiment, the length can be at least double the width.

In one embodiment, the length can be at least triple the width.

The present invention includes a concrete mat apparatus, comprising a plurality of elongated concrete members, each member can be aligned with and next to another concrete member. Each of the concrete members can have an upper generally flat surface, a lower generally flat surface, and a plurality of inclined surfaces that each can extend away from an upper or lower surface. Reinforcement can extend from a first end portion of each concrete member to a second end portion thereof. The reinforcement preferably including a plurality of longitudinally extending reinforcement bars and a plurality of encircling tie bars at spaced apart intervals. Cabling can preferably connect each of the elongated concrete members to another of the elongated concrete members. The combination of elongated concrete members can have a width and a length that can be at least twice as long as the width. The upper inclined surfaces of one of the elongated concrete members can form a plane with the lower inclined surface of an adjacent elongated concrete member. A plurality of loops can be along opposed edges of the mat, each loop formed by a portion of the cabling. The loops can be between about one and three feet (30.5 and 91.4 cm) apart. One or more layers of articulating mats can be stacked upon the concrete members. A pipeline can rest upon the combination of blocks and beams.

In one embodiment, there can be at least three of the elongated concrete members and at least two layers of articulating mats.

In one embodiment, there can be at least four of the elongated concrete members and at least three layers of articulating mats.

In one embodiment, there can be first and second supporting stacks, each stack including multiple of the concrete members and multiple of the articulating mats.

In one embodiment, there can be a gap between the stacks.

In one embodiment, the reinforcement preferably includes a plurality of upper longitudinally extending reinforcement bars and a plurality of lower longitudinally extending reinforcement bars.

In one embodiment, each of the loops can be positioned at the intersection of an upper inclined surface and a lower inclined surface.

In one embodiment, a second pipeline can occupy the gap.

In one embodiment, the pipelines preferably do not contact each other.

In one embodiment, further comprising one or more layers of articulating block mats supported upon the concrete members.

In one embodiment, further comprising a pipeline that can be resting upon the articulating mat layer or layers so that load transfer is from the pipeline, to the articulating mat layer or layers, to the elongated concrete members and to a seabed or water bottom.

In one embodiment, further comprising equipment that can be resting upon the articulating mat layer or layers so that load transfer is from the equipment, to the articulating mat layer or layers, to the elongated concrete members and to a seabed or water bottom.

A concrete mat apparatus, includes a plurality of elongated concrete members, each member being aligned with and next to another concrete member. Each of the concrete members has an upper generally flat surface, a lower generally flat surface, and a plurality of inclined surfaces that each extend away from an upper or lower surface. Reinforcement extends from a first end portion of each concrete member to a second end portion thereof, the reinforcement including a plurality of longitudinally extending reinforcement bars and a plurality of encircling tie bars at spaced apart intervals. Cabling connects each of the elongated concrete members to another of the elongated concrete members. The combination of elongated concrete members has a width and a length that is at least twice as long as the width. The upper inclined surfaces of one of the elongated concrete members forms a plane with the lower inclined surface of an adjacent elongated concrete member. A plurality of loops are provided along opposed edges of the mat, each loop formed by a portion of the cabling. The loops can be spaced between about one and three feet (30.5 and 91.4 cm) apart.

BRIEF DESCRIPTION OF THE SEVERAL VIEWS OF THE DRAWINGS

For a further understanding of the nature, objects, and advantages of the present invention, reference should be had to the following detailed description, read in conjunction with the following drawings, wherein like reference numerals denote like elements and wherein:

FIG. 1 is a plan or top view of a preferred embodiment of the apparatus of the present invention;

FIG. 2 is a partial top view of a preferred embodiment of the apparatus of the present invention;

FIG. 3 is a partial side view of a preferred embodiment of the apparatus of the present invention;

FIG. 14 is a side, elevation view of a preferred embodiment of the apparatus of the present invention showing the support of an underwater pipeline;

FIG. 15 is an end, elevation view of a preferred embodiment of the apparatus of the present invention showing the support of an underwater pipeline;

FIG. 16 is a plan view of a preferred embodiment of the apparatus of the present invention showing first and second pipelines crossing one another at differing elevations;

FIG. 17 is an elevation view of a preferred embodiment of the apparatus of the present invention showing first and second pipelines crossing one another at differing elevations;

DETAILED DESCRIPTION OF THE INVENTION

Figure 4:
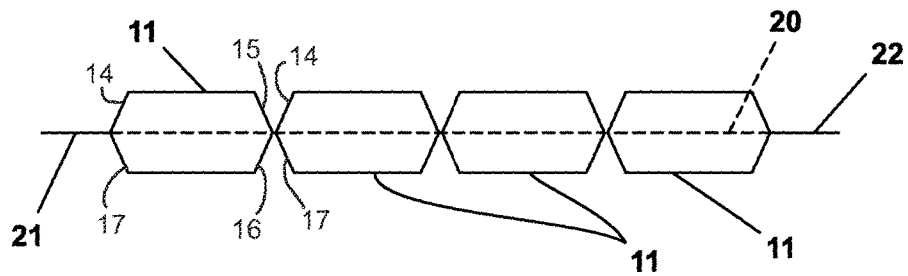
FIG. 4 is a side sectional view of a preferred embodiment of the apparatus of the present invention.

FIGS. 1-8 show preferred embodiments of the apparatus of the present invention designated generally by the numeral 10. Mat apparatus 10 is preferably formed of a plurality of elongated concrete members or beams 11. As seen in FIG. 1, there can be a plurality of, for example, four (4) elongated concrete members 11 to form overall mat 10. Mat 10 can be about 40 feet (12.2 meters) long and about 8 feet (2.4 meters) wide as an example.

Figure 5:
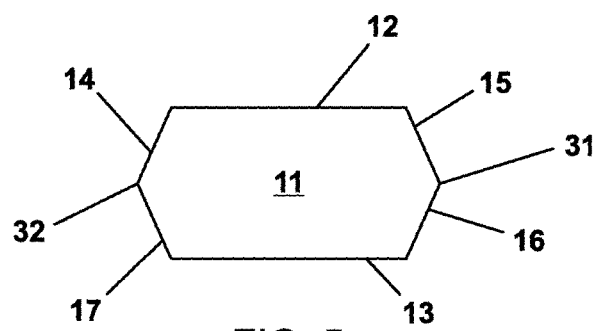
FIG. 5 is a side sectional view of a preferred embodiment of the apparatus of the present invention.
Figure 7:
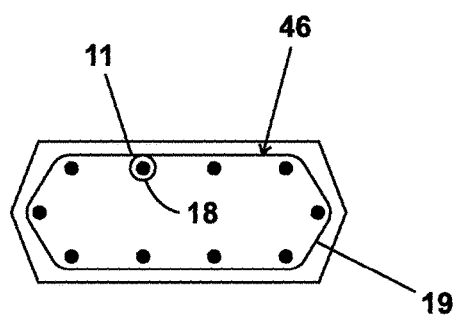
FIG. 7 is a side sectional view of a preferred embodiment of the apparatus of the present invention.
Figure 6:
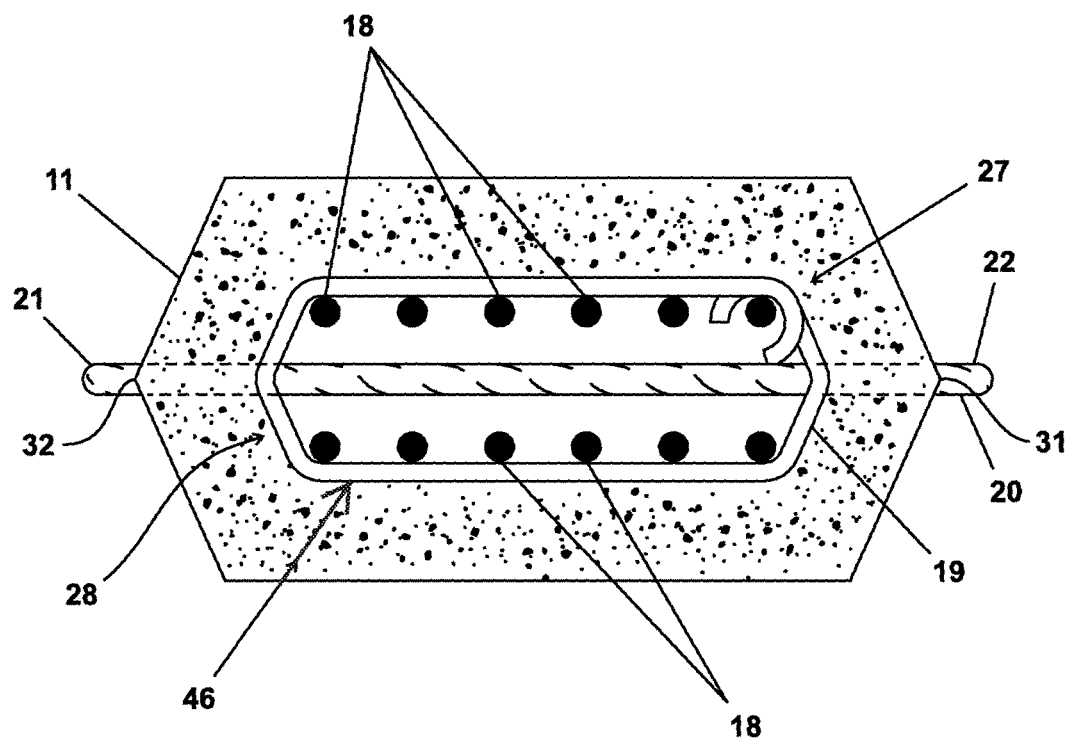
FIG. 6 is a side sectional view of a preferred embodiment of the apparatus of the present invention.
Figure 8:
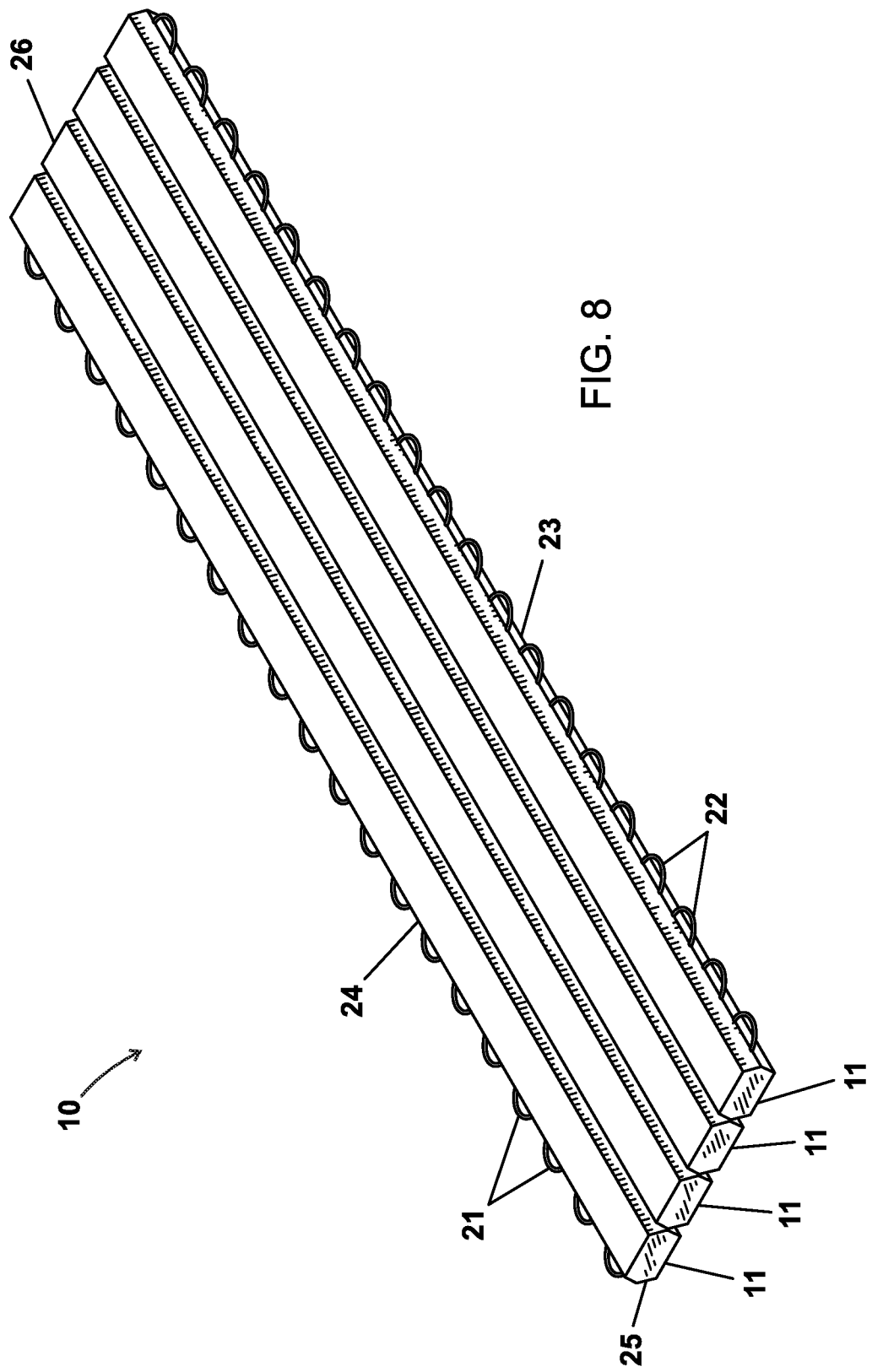
FIG. 8 is a perspective view of a preferred embodiment of the apparatus of the present invention.
Figure 9:
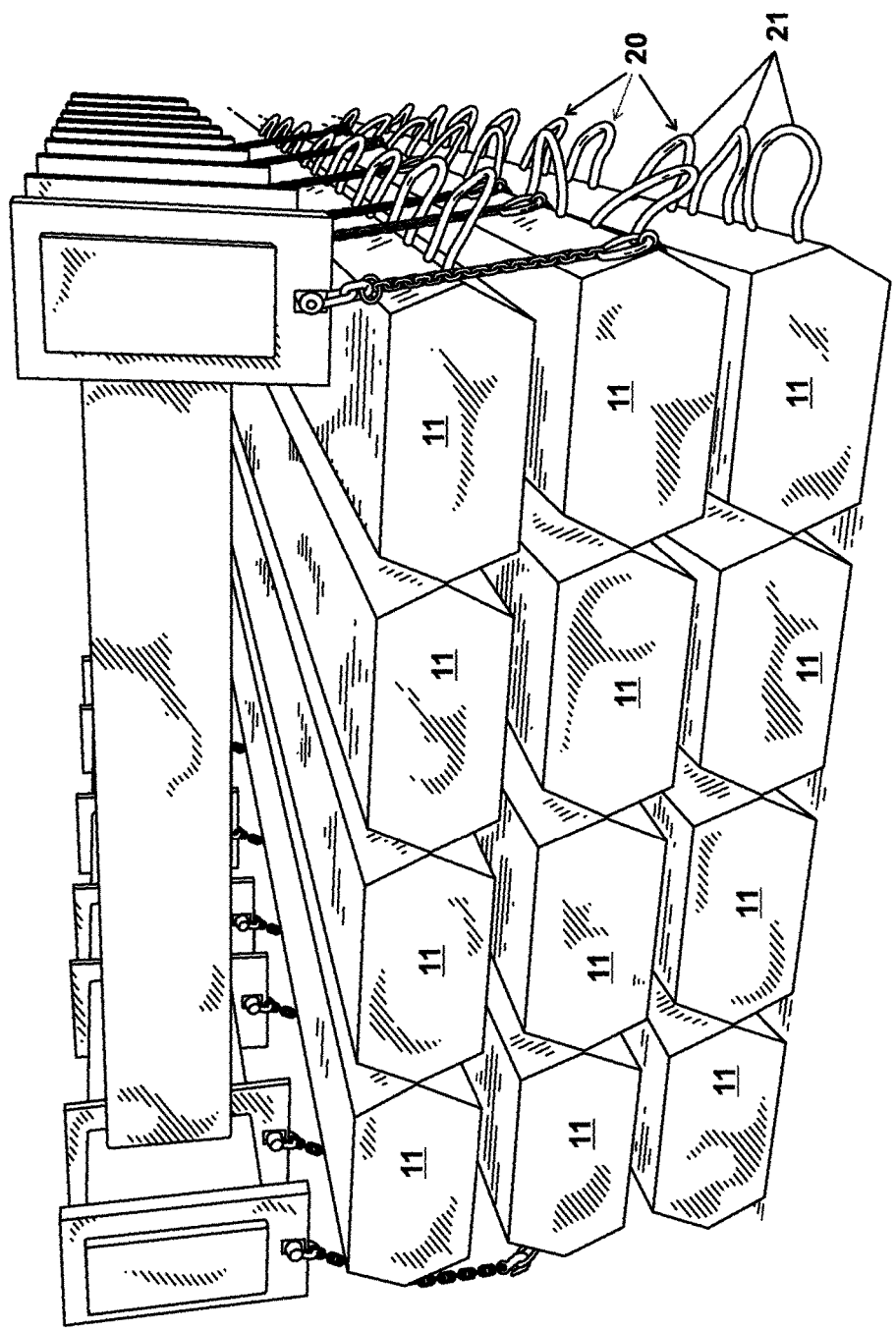
FIG. 9 is a perspective view of a preferred embodiment of the apparatus of the present invention.

The mat 10 preferably provides an edge at 23, an edge at 24, an end at 25, and an end at 26. The edges 23, 24 can preferably be parallel. The ends 25, 26 can preferably be parallel as seen in FIGS. 1 and 8. Cabling 20 preferably extends from one loop to another loop. In one embodiment of the present invention, the loops can be formed by one continuous endless rope or cable 20. Cable or rope 20 can be made of polypropylene or another similar material. In another embodiment of the present invention, endless loops can be used, each extending through preferably all (e.g., four) of the beams 11 and between a pair of loops 21 and 22. In one embodiment of the present invention, each beam or elongated concrete member 11 can be, for example, about two feet (61 cm) wide and about one foot (30.5 cm) tall as seen in FIGS. 5-7. Each of the surfaces 14, 15 preferably forms an obtuse angle with surface 12 as seen in FIG. 5. Similarly, the surfaces 16, 17 each preferably form an obtuse angle with the surface 13 as seen in FIG. 5.

Figure 10:
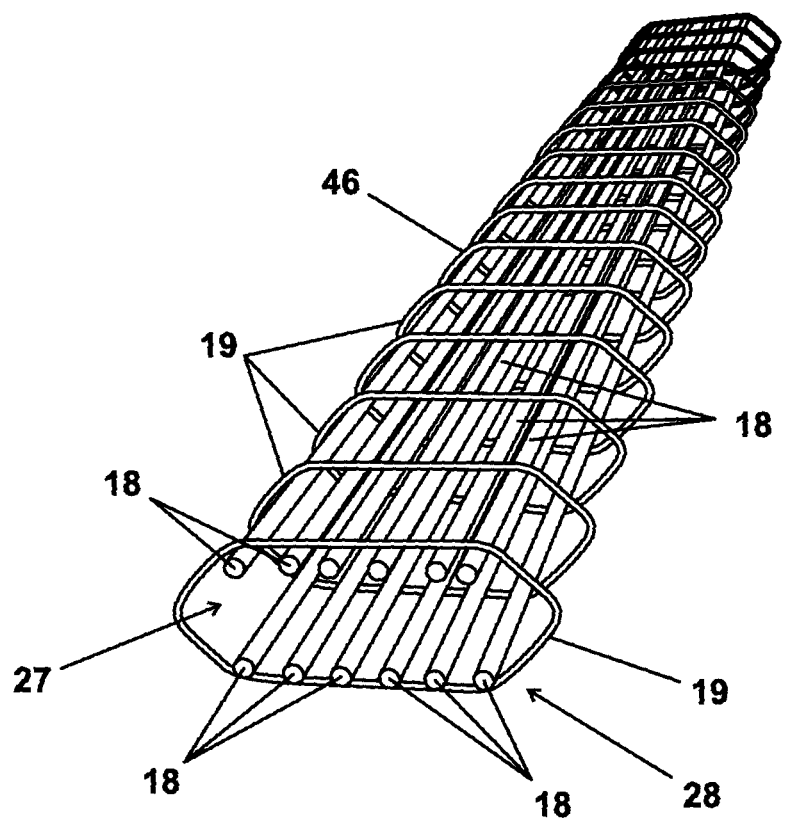
FIG. 10 is a perspective view of a preferred embodiment of the apparatus of the present invention.

In FIG. 6, elongated reinforcing bars 18 can be provided, preferably in multiple groups. The groups include an upper group 27 and a lower group 28. In one embodiment of the present invention, each of these bars 18 can be #7 reinforcing bars. The upper group 27 of reinforcing bars 18 would preferably be in the upper half of the concrete beam or member 11. Similarly, the lower group 28 of reinforcing bars 18 would preferably be in the lower half of the concrete beam or member 11 as seen in FIGS. 6 and 10. Rope or cable 20 can extend out each side of beam or member 11 and through another of said beam or member 11 (see FIG. 4). Rope or cable 20 can extend through beams 11 in between the upper and lower longitudinally extending reinforcing bars 27, 28, as seen in FIG. 6

Stirrups or ties 19 or other encircling reinforcing bars can preferably be provided, preferably at spaced apart locations as seen in FIG. 10, such as one per foot (30.5 cm) spacing. Stirrups 19 can be #4 stirrups as an example. When connected together, as shown in FIG. 1, each beam or concrete member 11 can form an angle with the beam or concrete member 11 next to it such as when the surface 16 or 17 of one beam can move closer to the corresponding surface 16 or 17 of an adjacent beam 11. One beam 11 is thus able to articulate or pivot relative to the beam 11 next to it. The pivoting of one beam 11 relative to another beam 11 can enable contact of the surface 16 or 17 with surface 16 or 17 of the adjacent beam 11.

In various preferred embodiments of the present invention, the reinforcing shown in FIGS. 6-7 can extend the full length of the elongated concrete member or beam 11 or about 90% of the length of the elongated concrete member or beam 11 or between about 60% and 70% of the length of the beam or concrete member 11.

In one embodiment of the present invention, the surfaces 14 and 17 meet at an edge 32. Similarly, in one embodiment of the present invention the surfaces 15 and 16 meet at an edge 31. The cabling 20 can extend from an edge 31 or 32 of one beam 11 to an edge 31 or 32 of an adjacent beam or member 11.

Figure 11:
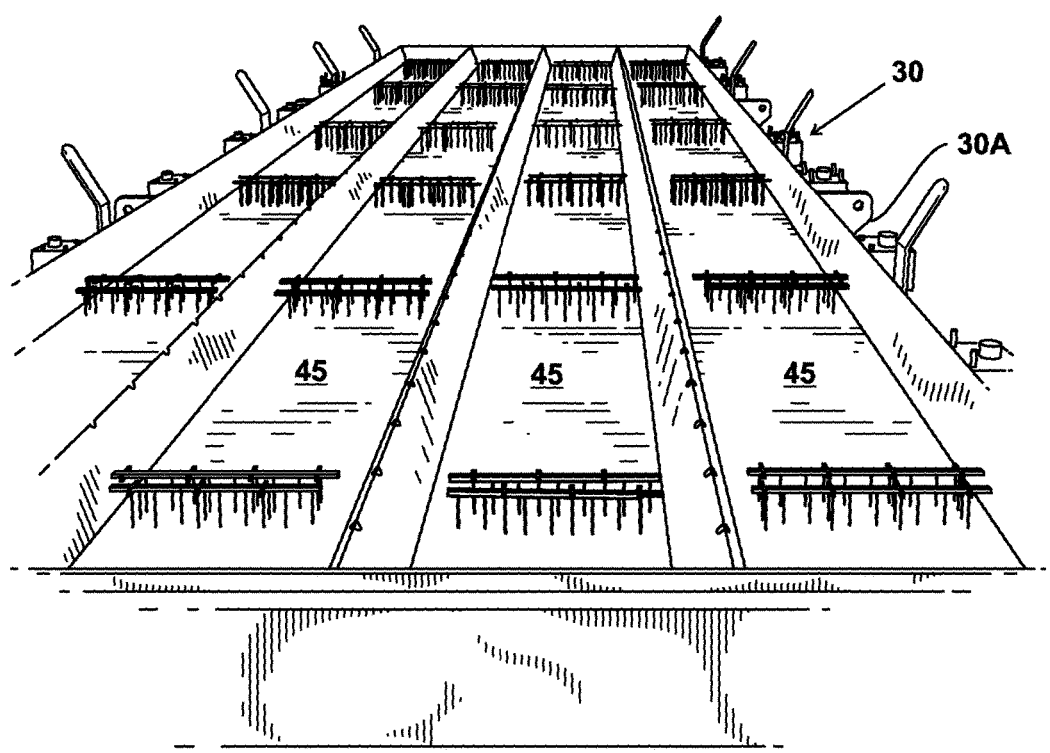
FIG. 11 is a partial perspective view of a preferred embodiment of the apparatus of the present invention.
Figure 12:
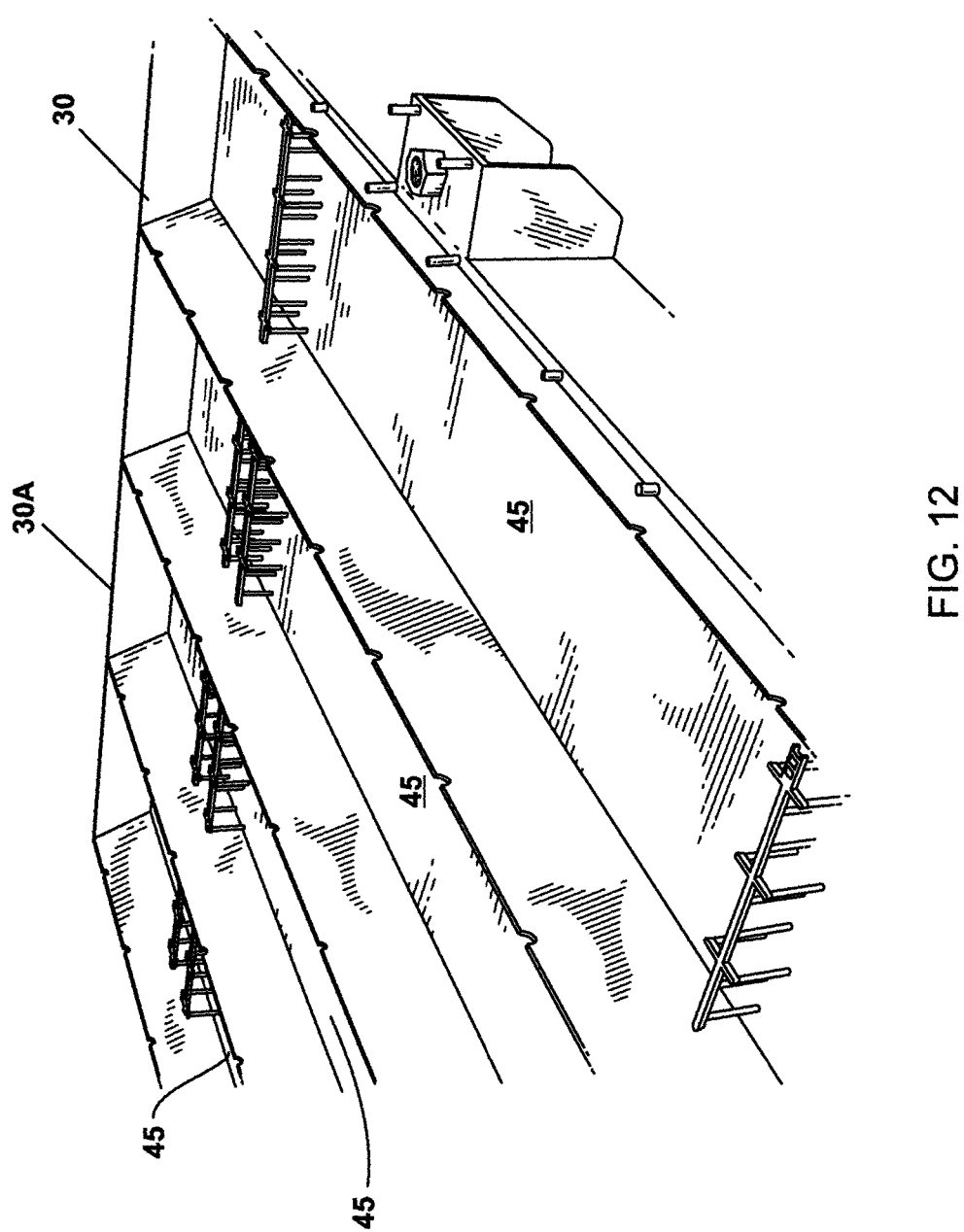
FIG. 12 is a partial perspective view of a preferred embodiment of the apparatus of the present invention.
Figure 13:
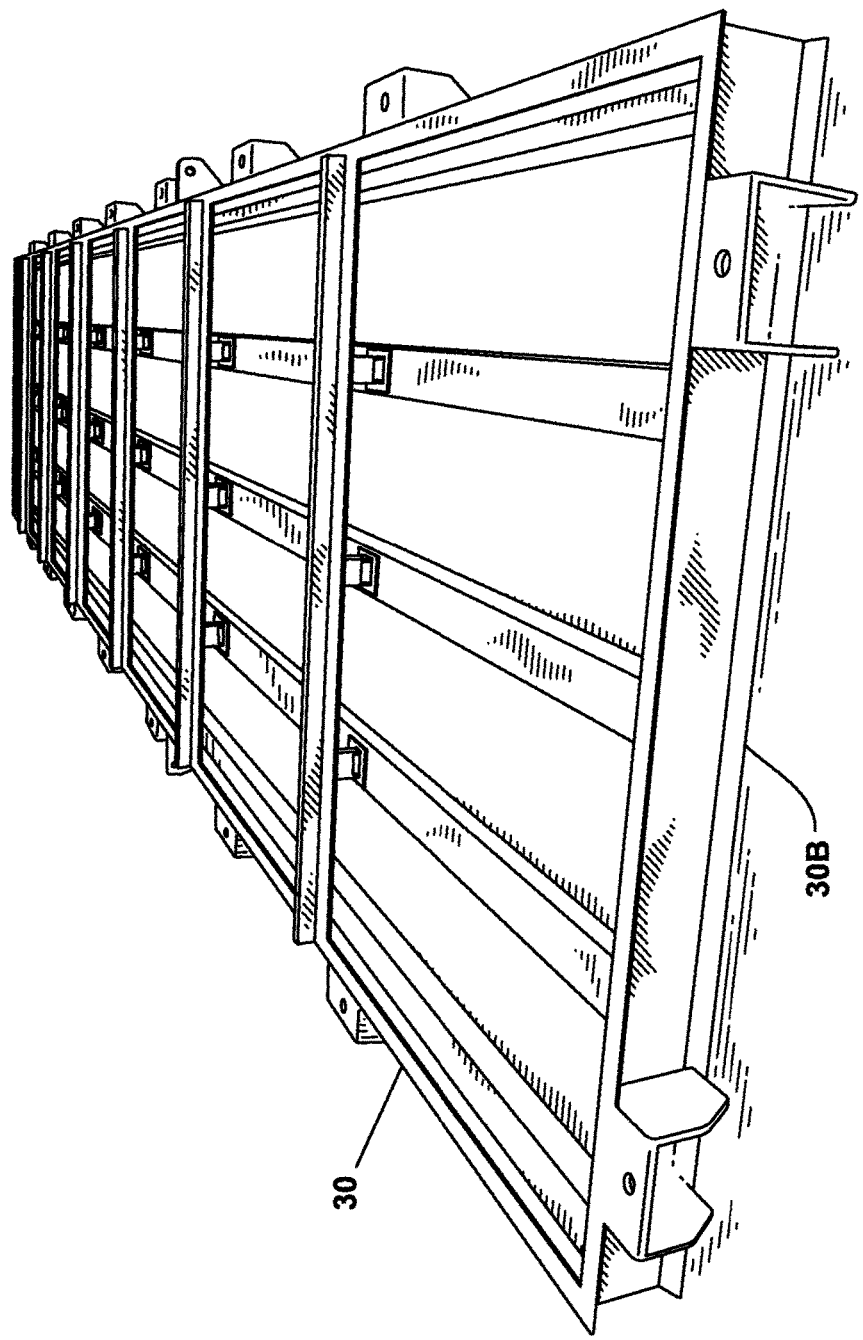
FIG. 13 is a perspective view of a preferred embodiment of the apparatus of the present invention.

FIGS. 11-13 are views showing a mould 30 that could be used to construct an elongated concrete member 11. Mould 30 has a lower section 30A and an upper section 30B. Lower section 30A shapes bottom surface 13 and inclined surface 16, 17. Upper section 30B shapes upper surface 12 and inclined surfaces 14, 15. Mould 30 lower 30A and upper 30B sections form ends 25, 26. For the mat 10 shown in FIG. 1, four mould cavities 45 would be placed side by side to form lower section 30A. The rope or cable 20 would preferably extend from one mould cavity 45 to the next mould cavity 45 and from one loop 21 to the other loop 22 for each of the loops. The rope or cable 20 would be positioned in between the upper group of longitudinal reinforcement bars 27 and the lower group of longitudinal reinforcement bars 28 for each beam 11 as seen in FIG. 6. In one embodiment of the present invention, the concrete members 11 can be between about 0 and 1 inch (0 and 2.5 cm) apart. In one embodiment of the present invention, the beams 11 can be for example between about 20 and 40 feet (6.1-12.2 meters) in length as seen in FIGS. 2 and 3. FIGS. 11-13 show mould 30 in more detail. Mould 30 is filled with a reinforcement 46 as seen in FIGS. 6-7 and 10. As seen in FIG. 10, there can be stirrups 19 spaced at intervals. A transverse cable section 47 of rope/cable 20 can be positioned between each pair of stirrups 19 (see FIG. 1). For example, the stirrups 19 can be one foot (30.5 cm) apart. The transverse cable sections 47 can also be about one foot (30.5 cm) apart. Each transverse cable section 47 can be in between two stirrups 19 spaced about six inches (6") (15.2 cm) from each stirrup 19 closest to a particular transverse cable section 47. In FIG. 1, the arrows 48 show positions for the stirrups 19. In one embodiment, there is a stirrup 19 between each pair of transverse cable sections 47. In FIG. 1, there can be forty (40) transverse cable sections 47 and between thirty-nine and forty-one (39-41) stirrups 19.

Figure 18:
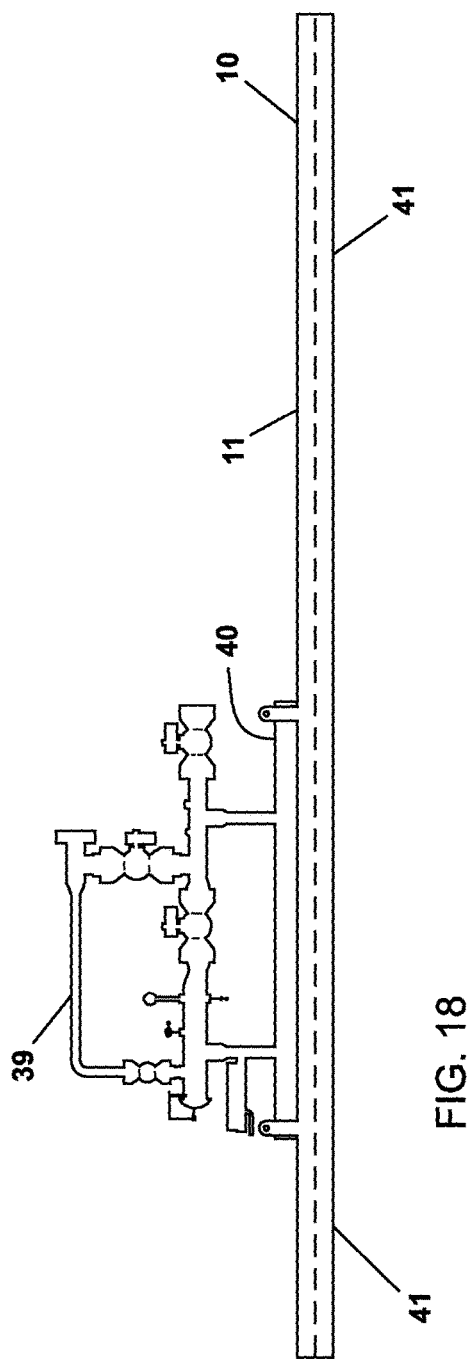
FIG. 18 is an elevation side view of a preferred embodiment of the apparatus of the present invention showing an underwater equipment support.
Figure 19:
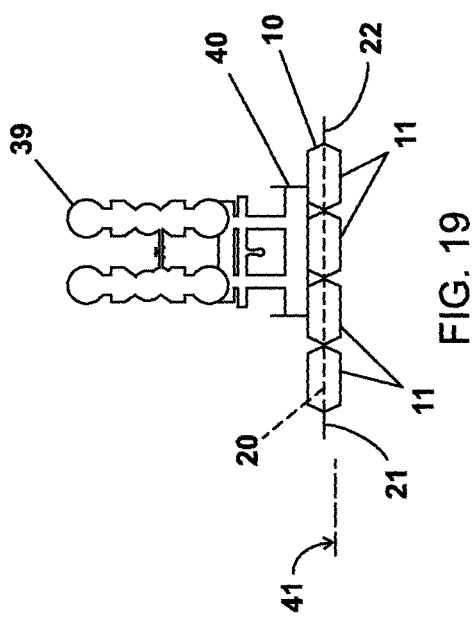
FIG. 19 is an elevation end view of a preferred embodiment of the apparatus of the present invention showing an underwater equipment support.

FIGS. 14-19 show other embodiments of the apparatus of the present invention in an underwater environment supporting a pipeline 33 (FIGS. 14 and 15), a pipeline 37 and 38 crossing or bridge (FIGS. 16 and 17) and an equipment support 39 (FIGS. 18 and 19).

In FIGS. 14 and 15 there can be seen a mat apparatus 10 resting on a seabed or water bottom 41. In FIGS. 14 and 15, mat apparatus 10 is shown with four (4) elongated concrete members or beams 11 connected with a cable or cables 20. The mat 10 in FIGS. 14-15 can be as shown and constructed in accordance with FIGS. 1-13. A four (4) beam 11 mat 10 can be seen in FIGS. 1 and 8. Such a four (4) beam 11 mat 10 can be seen in FIGS. 14-15.

Placed upon mat 10 in FIGS. 14-15 are multiple layers of articulating mats. These layers of articulating mats can include upper layer 34, middle layer 35 and lower layer 36. Such articulating mat or mat layers 34, 35, 36 can be seen for example in prior U.S. Pat. Nos. 8,858,118; 9,518,366; 9,797,105 entitled "Erosion Control Mat System". U.S. Pat. Nos. 8,858,118; 9,518,366; 9,797,105 are each hereby incorporated herein by reference. Each mat layer 34, 35, 36 is comprised of a plurality of concrete or concretions blocks 42 interconnected by cables 43. In FIGS. 14-15, each beam 11 can have a width. Each block 42 can also have a width. Preferably, the beam 11 width is greater than the block 42 width as seen in FIG. 15. As an example, the beam 11 can have a width that is about twice as large as the width of a block 42 (see FIG. 15).

FIGS. 16 and 17 show a bridge arrangement where a pipeline 38 rests on a seabed or water bottom 41. The apparatus 10 supports a second pipeline 37 in an elevated position using beams 11 and articulating mat layers 34, 35, 36 in two spaced apart supports 10A, 10B. There is a gap 44 in between supports 10A, 10B. Pipeline 38 occupies the gap 44 while resting on seabed or water bottom 41. Pipeline 37 spans across the gap 44 and rests upon supports 10A, 10B.

FIGS. 18 and 19 show an article of equipment 39 such as an assembly of pipe, valves and fittings. Assembly 39 rests upon a skid or base 40. Base 40 rests upon mat apparatus 10 which rests on a seabed or water bottom 41. Mat 10 includes beams 11 and can be interconnected by cables 20.

The following is a list of parts and materials suitable for use in the present invention:

PARTS LIST

| PART NUMBER | DESCRIPTION |
| --- | --- |
| 10 | mat apparatus |
| 10A | support |
| 10B | support |
| 11 | elongated concrete member/beam |
| 12 | upper flat surface |
| 13 | lower flat surface |
| 14 | inclined surface |
| 15 | inclined surface |
| 16 | inclined surface |
| 17 | inclined surface |
| 18 | longitudinally extending reinforcing bar |
| 19 | tie/encircling reinforcing bar/stirrup |
| 20 | rope/cable |
| 21 | loop |
| 22 | loop |
| 23 | edge |
| 24 | edge |
| 25 | end |
| 26 | end |
| 27 | upper group |
| 28 | lower group |
| 30A | lower section |
| 30B | upper section |
| 30 | mould |
| 31 | edge |
| 32 | edge |
| 33 | pipeline |
| 34 | articulating mat |
| 35 | articulating mat |
| 36 | articulating mat |
| 37 | pipeline |
| 38 | pipeline |
| 39 | equipment/pipe, valve and fitting assembly |
| 40 | base/skid |
| 41 | water bottom/seabed |
| 42 | block |
| 43 | cable |
| 44 | gap |
| 45 | mould cavity |
| 46 | reinforcement/reinforcement assembly |
| 47 | transverse cable section |
| 48 | arrow |

All measurements disclosed herein are at standard temperature and pressure, at sea level on Earth, unless indicated otherwise. All materials used or intended to be used in a human being are biocompatible, unless indicated otherwise.

The foregoing embodiments are presented by way of example only; the scope of the present invention is to be limited only by the following claims.

The invention claimed is:

1. A concrete mat apparatus, comprising:
(a) a plurality of elongated concrete members, each elongated concrete member being aligned with and next to another elongated concrete member;
(b) each of the elongated concrete members having an upper generally flat surface, a lower generally flat surface, and a plurality of inclined surfaces that each extend away from an upper generally flat or lower generally flat surface;
(c) reinforcement that extends from a first end portion of each elongated concrete member to a second end portion of each elongated concrete member, said reinforcement including a plurality of upper longitudinally extending reinforcement rods, a plurality of lower longitudinally extending reinforcement rods and a plurality of stirrups located at spaced apart intervals, each said stirrup encircling multiple of said longitudinally extending reinforcing rods;
(d) cabling that connects each of the elongated concrete members to another of said elongated concrete members, said cabling including generally parallel, transversely extending cable sections, each cable section extending transversely through multiple of said elongated concrete members;

(e) wherein the elongated concrete members define in combination a mat having a width and a length that is at least twice as long as the width;

(f) said plurality of inclined surfaces including upper inclined surfaces forming a plane with a lower inclined surface of another said elongated concrete member;

(g) a plurality of loops along opposed edges of the mat, each loop formed by a portion of said cabling;

(h) wherein said loops are between one and three feet (30.5 and 91.4 cm) apart;

(i) wherein there are said stirrups positioned on each side of and spaced from each said generally parallel transversely extending cable section: and (j) further comprising one or more layers of articulating block mats supported upon the plurality of elongated concrete members.

2. The concrete mat apparatus of claim 1, wherein there are at least three of said elongated concrete members.

3. The concrete mat apparatus of claim 1, wherein there are at least four of said elongated concrete members.

4. The concrete mat apparatus of claim 1, wherein each of the elongated concrete members is 40 feet (12.2 meters) in length.

5. The concrete mat apparatus of claim 1, wherein each of the elongated concrete members is between 20 and 40 feet (6.1-12.2 meters) long.

6. The concrete mat apparatus of claim 1, wherein each of the loops are positioned at an intersection of one of said upper inclined surface and one of said lower inclined surface.

7. The concrete mat apparatus of claim 1, wherein the upper plurality of longitudinally extending reinforcement bars is positioned in between two said upper inclined surfaces.

8. The concrete mat apparatus of claim 1, wherein the plurality of longitudinally extending reinforcement bars are positioned in between two said lower inclined surfaces.

9. The concrete mat apparatus of claim 1, wherein the cabling is positioned in a plane that is in between the said upper and lower pluralities of longitudinally extending reinforcement bars.

10. The concrete mat apparatus of claim 1, wherein the loops are formed with a continuous one piece elongated cable.

11. The concrete mat apparatus of claim 1, wherein the loops are formed of a plurality of endless circular rope sections, each endless rope section including first and second spaced apart loops.

12. The concrete mat apparatus of claim 1, wherein each elongated concrete member has a width and a height, the width being greater than the height.

13. The concrete mat apparatus of claim 1, wherein the length is greater than the width.

14. The concrete mat apparatus of claim 13, wherein the length is at least double the width.

15. The concrete mat apparatus of claim 13, wherein the length is at least triple the width.

16. The concrete mat apparatus of claim 1, wherein a first pipeline is resting upon the one or more layers of articulating mats so that load transfer is from the first pipeline, to the articulating mat layer or layers, to the elongated concrete members and to an underlying seabed or water bottom.

17. The concrete mat apparatus of claim 1, further comprising equipment resting upon the one or more layers of articulating mats so that load transfer is from the equipment, to the articulating mat layer or layers, to the elongated concrete members and to a seabed or water bottom.

18. A concrete mat apparatus, comprising:

(a) a plurality of elongated concrete members, each elongated concrete member being aligned with and next to another elongated concrete member;

(b) each of the elongated concrete members having an upper generally flat surface, a lower generally flat surface, and a plurality of inclined surfaces that each extend away from an upper generally flat surface or lower generally flat surface;

(c) reinforcement that extends from a first end portion of each elongated concrete member to a second end portion of each elongated concrete member, said reinforcement including a plurality of longitudinally extending reinforcement bars and a plurality of encircling tie bars located at spaced apart intervals along said elongated concrete member;

(d) cabling that connects each of the elongated concrete members to another of said elongated concrete members, said cabling including multiple transversely extending cable sections, each said tie bar being in between two of said cable sections;

(e) wherein the elongated concrete members define a mat having a width and a length that is at least twice as long as the width;

(f) the inclined surfaces including upper inclined surfaces and lower inclined surfaces, one of said upper inclined surfaces of one of said elongated concrete members forming a plane with a said lower inclined surface of another of said elongated concrete member;

(g) a plurality of loops along opposed edges of the mat, each loop formed by a portion of said cabling;

(h) wherein said loops are between one and three feet (30.5 and 91.4 cm) apart;

(i) first and second, spaced apart layers of articulating mats stacked upon said elongated concrete members with a gap in between said first and second layers and above said elongated concrete members;

(j) a first pipeline resting upon said first and second layers; and k) a second pipeline positioned in said gap and below said first pipeline.

19. The concrete mat apparatus of claim 18, wherein there are at least three of said elongated concrete members.

20. The concrete mat apparatus of claim 18, wherein there are at least four of said elongated concrete members.

21. The concrete mat apparatus of claim 18, wherein there are first and second spaced apart supporting stacks, each stack including multiple of said plurality of elongated concrete members.

22. The concrete mat apparatus of claim 18, wherein the longitudinally extending bars include a plurality of upper longitudinally extending reinforcement bars and a plurality of lower longitudinally extending reinforcement bars.

23. The concrete mat apparatus of claim 18, wherein the inclined surfaces include upper inclined surfaces and lower inclined surfaces, each of the loops positioned at an intersection of a said upper inclined surface and a said lower inclined surface.

24. The concrete mat apparatus of claim 18, wherein the pipeline and the second pipeline do not contact each other.

25. The concrete mat apparatus of claim 22, wherein the cabling is positioned in a plane that is in between the said upper longitudinally extending reinforcement bars and said lower longitudinally extending reinforcement bars.

* * * * *

UNITED STATES PATENT AND TRADEMARK OFFICE
CERTIFICATE OF CORRECTION

PATENT NO. : 10,301,788 B2
APPLICATION NO. : 15/801560
DATED : May 28, 2019
INVENTOR(S) : Benton, Jr. et al.

Page 1 of 1

It is certified that error appears in the above-identified patent and that said Letters Patent is hereby corrected as shown below:

On the Title Page

Item (12) "Benton, Jr." should read -- Benton, Jr., et al. --.

Item (72) Inventor is corrected to read:
-- Stephen G. Benton, Jr., Metairie (LA);
Kevin Babin, Baton Rouge (LA) --.

Signed and Sealed this
Twenty-third Day of July, 2019

Andrei Iancu
*Director of the United States Patent and Trademark Office*